United States Patent [19]

O'Rourke, Jr.

[11] 4,288,983
[45] Sep. 15, 1981

[54] TURBOFAN ENGINE HAVING CORE SUPERCHARGING STAGE

[75] Inventor: Thomas E. O'Rourke, Jr., Glastonbury, Conn.

[73] Assignee: United Technologies Corporation, Hartford, Conn.

[21] Appl. No.: 952,869

[22] Filed: Oct. 19, 1978

[51] Int. Cl.³ .............................................. F02K 3/06
[52] U.S. Cl. .................................. 60/226 R; 60/262; 415/77; 415/79
[58] Field of Search ............... 60/226 R, 262; 415/79, 415/77

[56] References Cited

U.S. PATENT DOCUMENTS

| | | | |
|---|---|---|---|
| 3,494,129 | 2/1970 | Krebs | 415/79 |
| 3,638,428 | 2/1972 | Shipley | 60/226 R |
| 3,713,748 | 1/1973 | Langley | 60/226 R |
| 4,005,574 | 2/1977 | Smith | 60/226 R |
| 4,055,042 | 10/1977 | Colley | 60/226 R |

*Primary Examiner*—Douglas Hart
*Attorney, Agent, or Firm*—Robert C. Walker

[57] ABSTRACT

A turbofan configuration for a gas turbine engine is disclosed. Various construction details which improve engine performance by supercharging working medium gases to the engine core are discussed. Engines configured in accordance with the present invention include an island splitter which is disposed across the fan flow path. The island splitter is spaced apart from the core engine case. A supercharging, compression stage is driven commonly with the fan stage and extends outwardly into proximity with the core case.

7 Claims, 1 Drawing Figure

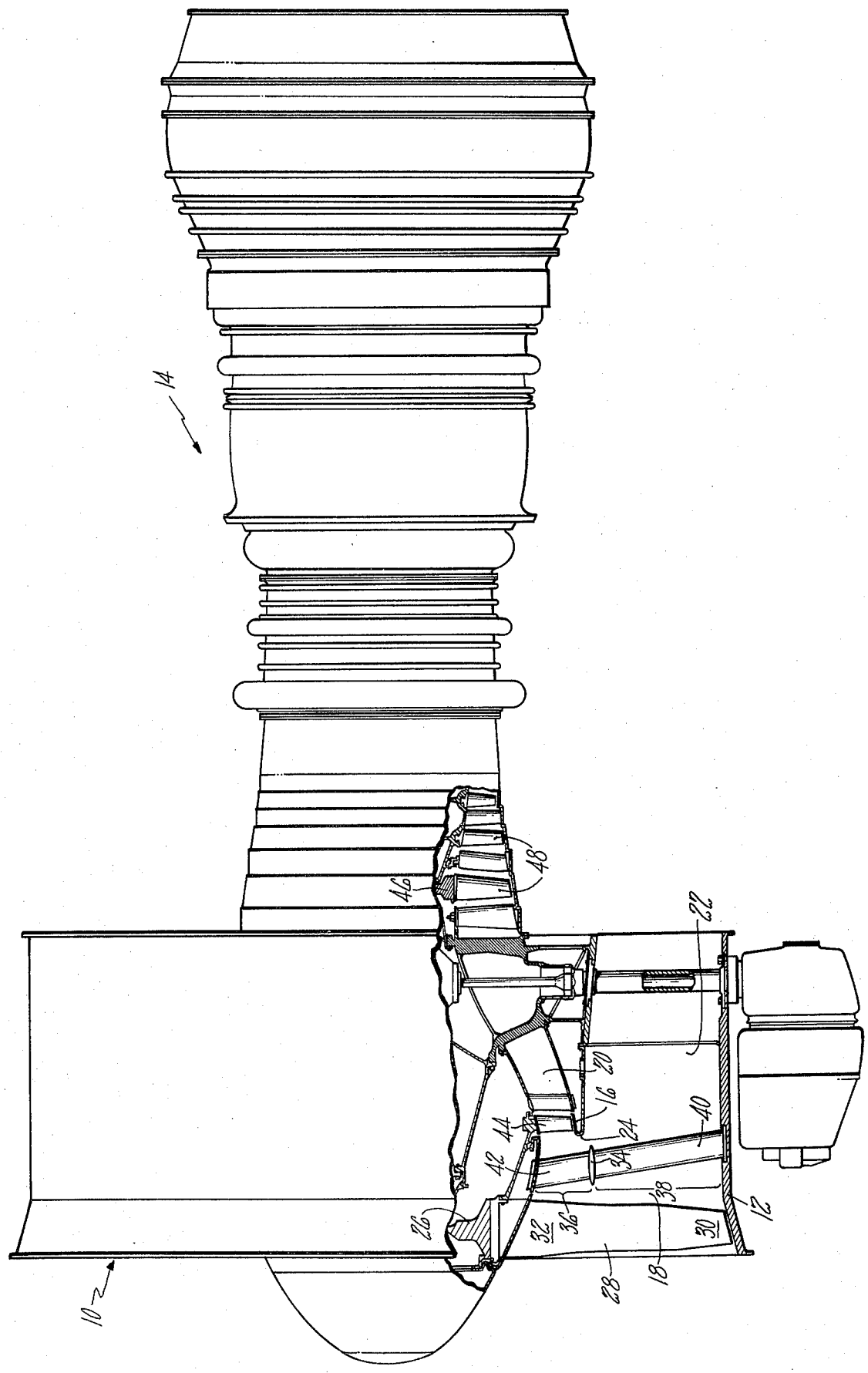

4,288,983

TURBOFAN ENGINE HAVING CORE SUPERCHARGING STAGE

BACKGROUND OF THE INVENTION

1. Field of the Invention

This invention relates to turbofan gas turbine engines, and more specifically to supercharging of working medium gases flowed through the core section of such an engine.

2. Description of the Prior Art

Turbofan, gas turbine engines are the type of powerplants most widely used in large aircraft today. In turbofan engines, as distinguished from turbojet engines, a portion of the working medium is pumped axially through one or more compression stages and is exhausted to the atmosphere without passing through the core section of the engine. Such compression stages are called fan stages.

In the least complex of turbofan engines, the stages of the fan and the stages of the core are driven by separately rotating shafts. The shaft driving the fan stages rotates at a speed slower than the shaft driving the core stages. The ratio of the air flowing through the fan stages alone to the air flowing through the core stages is referred to as the bypass ratio. The bypass ratio may be a different value for each individual engine model according to the performance requirements of that powerplant. In all turbofan engines, however, the fan stages make a substantial contribution to the total engine thrust at take-off.

For large thrust contributions a bypass ratio of five (5) or greater is typical. At these bypass ratios the diameter of the fan need be very large to pass the required amount of working medium. In such a configuration, the root region of each fan blade is of necessity closely spaced to the root region of the adjacent blade in order that the tip regions of the blades are not excessively spaced. The root regions of the blades have a relatively short chord length and a minimal twist. Also, the blade speed relative to the incoming medium is significantly less in the root region. Resultantly, the root portions of the blades have a limited capacity to raise the pressure of the medium pumped thereby. In a typical turbofan engine, the pressure ratio attainable across the fan blades in the root region is only a ratio of about one and five tenths (1.5) in contrast to the pressure ratio attainable across the tip regions of the blades which is a ratio of approximately one and seven tenths (1.7).

To compensate for the reduced capacity of the fan blades in the root regions, modern engines utilize one of two configurations for raising the pressure of the medium approaching the core stages of the engine. A first approach is embodied in representative U.S. Pat. No. 3,283,995 to Fligg, Jr. entitled "Splitter Vane Construction for Turbofan Engine". In this turbofan configuration, low compression or supercharging stages are mechanically coupled to the fan stage immediately downstream of the fan stage. A core case circumscribes the low compression stages and extends into close proximity to fan blades. The inward portion of the working medium gases discharged by the fan stage is captured by the core case and is directed into the low compression stages.

In a second approach illustrated by U.S. Pat. Nos. 3,494,129 to Krebs et al entitled "Fluid Compressors and Turbofan Engines Employing Same"; 3,528,246 to Fischer entitled "Fan Arrangement for High Bypass Ratio Turbofan Engine"; and 3,536,414 to Smith, Jr. entitled "Vanes for Turning Fluid Flow in an Annular Duct", short fan blades extend outwardly to a flow splitter disposed across the fan stream. The flow splitter extends into close proximity to the fan blades. Flow treated by the inward portions of the fan blades is confined by the splitter and subsequently treated in total by the short blades.

Although the two turbofan configurations discussed above have significant structural dissimilarities, both configurations aerodynamically couple the low compression, or supercharging stages to the fan stages. In the former, the core case extends into close proximity with the fan blades causing the working medium discharged by the inward portion of the fan stage to be directed in total into the low compression stages. In the latter, the flow splitter extends into close proximity with the fan blades causing the working medium discharged by the fan inwardly of the splitter to be directed in total into the short blades forming the supercharging, compression stages. Such series treatment of common working medium gases is referred to as "aerodynamic coupling", and in both configurations the supercharging stage is aerodynamically coupled to the fan stage.

Although the configurations represented by this prior art are high technology structures providing adequate service in th aviation field today, scientists and engineers continue to search for yet improved configurations which will enhance performance and product reliability.

SUMMARY OF THE INVENTION

The primary aim of the present invention is to provide an improved turbofan configuration for an aircraft, gas turbine engine. Improved aerodynamic performance and engine reliabiity are sought, and specific objects are to provide structure having enhanced tolerance of inlet distortion and of bypass duct distortion.

According to the present invention the working medium gases flowing into the core section of a multispool, turbofan engine are supercharged by a core compression stage which is mechanically coupled to the fan stage, yet which is aerodynamically coupled to downstream compression stages of the core section.

In accordance with one detailed embodiment of the invention a core engine case circumscribes the core compression stages and an island splitter spaced apart from the core case is positioned axially between the fan and supercharging stages.

A primary feature of the present invention is the aerodynamically disassociated, but mechanically coupled fan and supercharging, compression stages. The fan stage is circumscribed by a fan case; the supercharging, compression stage is circumscribed by a core engine case. An island splitter is disposed across the fan flow path at a location upstream of the core case and is spaced apart from the core case. In one detailed embodiment a plurality of guide vanes extend inwardly from the island splitter and a larger plurality of vanes extend outwardly from the island splitter.

A principal advantage of the present invention is the aerodynamic disassociation of the supercharging, compression stage from the fan stage. The supercharging stage works solely upon medium gases acceptable by the engine core and avoids work on medium gases subsequently exhausted to the bypass stream. Reduced sensitivity to inlet distortions is provided by spacing the supercharging, compression stage well apart from the fan stage and by interposing the island splitter between the supercharging and fan stages. Reduced sensitivity to local backpressures in the bypass stream is provided by confining the supercharging, compression stage within the core stream. Reduced engine weight results from locating the supercharging stage in the core flow path rather than in the more radially outward fan flow path. Performance deterioration in the core compression stages is mitigated by enabling foreign particles to be centrifuged outward through the space between the island splitter and the core engine case. Noise control advantages result from confinement of supercharging stage work within the core engine case and from disposition of the island splitter and associated vanes across the fan stream.

The foregoing, and other objects, features and advantages of the present invention will become more apparent in the light of the following detailed description of the preferred embodiment thereof as shown in the accompanying drawing.

BRIEF DESCRIPTION OF THE DRAWING

A simplified, side elevation view of a turbofan, gas turbine engine having portions of the fan section and core section broken away to reveal fan and compression stages configured to the present invention is shown.

DETAILED DESCRIPTION

A multi-spool, turbofan engine configured to one embodiment of the present invention is illustrated in the Drawing. The engine principally comprises a fan section 10 having an essentially cylindrical fan case 12 and a core section 14 having a core case 16. A fan flow path 18 for working medium gases extends axially through the fan section. A core flow path 20 for working medium gases extends axially through the core section. A bypass flow path 22 for working medium gases exhausted directly to the atmosphere from the fan flow path extends axially between the core case and the fan case. A core splitter 24 for dividing the medium gases of the core flow path from the medium gases of the bypass flow path is formed at the upstream end of the core case.

A first rotor 26 extends axially through the core section 14 and into the fan section 10. At least one row of fan blades, as represented by the single fan blade 28, extends across the flow path 18 into proximity with case 12 to form a fan stage. Each blade has a tip region 30 and a root region 32. An island splitter 34 is disposed across the fan flow path downstream of the fan blades at a distance from the blades of less than one-half ($\frac{1}{2}$) chord length of the blades. The island splitter divides the fan flow path into an inward portion 36 and an outward portion 38. A first plurality of vanes, as represented by the single outward vane 40, extend between the island splitter and the fan case. A second plurality of vanes, as represented by the single inward vane 42, extend inwardly from the island spliter. In the embodiment shown, the inward and outward vanes are canted in the downstream direction at the outward ends thereof.

At least one row of supercharging, compressor blades, as represented by the single supercharging blade 44, is mechanically coupled to the fan stage of the first rotor and extends outwardly across the core flow path 20 into proximity with the core case 16 to form a supercharging, compression stage. A second rotor 46 extends through the core section and includes at least one row of core, compressor blades, as represented by the single core blades 48, extending outwardly across the core flow path into proximity with the core case at a location downstream of the supercharging, compression stage of the first rotor to form core compression stages.

During operation of the engine described, working medium gases are first compressed by the fan stage. Medium gases discharging from the fan blades to the inward portion 36 of the fan flow path have an average pressure of approximately one and five tenths (1.5) times the pressure of the medium upstream of the fan blades. Medium gases discharging from the fan blades to the outward portion 38 of the fan flow path have an average pressure of approximately one and seven tenths (1.7) times the pressure of the medium upstream of the fan blades. The island splitter 34 separating the inward portion of the fan flow path from the outward portion of the fan flow path extends to less than one-half ($\frac{1}{2}$) chord length of the fan blades from the fan blades. Working medium gases flowing axially beneath the island splitter admix in the inward portion of the fan flow path to dissipate aerodynamic perturbations passed by the fan blades into the fan flow path from the engine inlet. The inward vanes 42 further smooth the flowing medium before additional work is performed by downstream compression stages. Accordingly, the supercharging blades treat a near homogeneous flow which is relatively free of pressure fluctuations.

Spacing the island splitter 34 apart from the core splitter 24 aerodynamically disassociates the supercharging blades 44 from the fan blades 28. The supercharging blades 44 work on only such a portion of the working medium gases as is acceptable by the core compression stages. During transient operating conditions when reduced flow is called for by the core, flow across the supercharging stage is also reduced. The fan blades, however, continue to operate on the full medium approaching the fan section. The excess medium in the inward portion of the fan flow path is allowed to flow between the downstream edge of the island splitter and the upstream edge of the core splitter and into the bypass flow path. Such enabled operation is particularly advantageous where reduced flow is called for by the core stages and where aerodynamic perturbations entrained in flow to the core are likely to induce a stall condition over the compression blading.

Although the supercharging, compression stage is mechanically coupled to the rotor driving the fan stage, the supercharging stage is aerodynamically coupled to the compression stages of the second rotor. The supercharging stage only does work on so much of the working medium gases as are acceptable by the core compression stages. Wasteful discharge of energy into the fanstream is avoided and the supercharging stage need not be capable of supplying work in excess of that required by the core.

One other important advantage of an engine configured to the present concepts is the limited exposure of the supercharging and core compression stage to foreign matter ingested by the engine. Spacing the island spliter remotely from the core splitter enables the outward direction of foreign particles through the space between the island splitter and the core splitter. Impact or errosion damage upon the supercharging and core blades is reduced.

The confinement of the supercharging, compression stage within the core case has a collateral benefit of reducing supercharging blade sensitivity to local backpressures generated in the bypass flow path. Struts across the bypass flow path, such as those illustrated in the Drawing, for supporting internal structure of the engine and for containing accessory drive mechanisms tends to generate local regions of backpressure. The supercharging blades of the present structure are isolated from such backpressure regions.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a turbofan engine of the type having a bypass flow path and a core flow path which are separated by a core case and of the type having a fan stage upstream of the core case, the improvement comprising in combination:
   an island splitter spaced radially apart from said core case at a locaton downstream of the fan stage placing said core flow path in communication with said bypass flow path immediately downstream of the island splitter; and
   a supercharging stage mechanically coupled to the fan stage and extending outwardly into proximity with the core case such that the mechanically coupled supercharging stage is adapted to work only upon medium gases of the core flow path.

2. The invention according to claim 1 which includes one or more additional of said supercharging stages mechanically coupled to the fan stage and extending outwardly to proximity with the core case.

3. The invention according to claims 1 or 2 wherein said island splitter is spaced radially outward of said core case.

4. The invention according to claim 3 which further includes a first plurality of vanes extending radially inward from said island splitter and a second plurality of vanes extending radially outward from said island splitter wherein the number of outwardly extending vanes is greater than the number of inwardly extending vanes.

5. The invention according to claim 4 wherein the fan stage has a plurality of blades, each having a chord length, and wherein the island spliter has an upstream end extending to a distance of less than one-half ($\frac{1}{2}$) fan blade chord length of the fan stage.

6. The invention according to claim 5 wherein the vanes extending radially inwardly and outwardly from the island splitter are canted in the downstream direction at the outward ends thereof.

7. A gas turbine engine structure comprising: a fan section including a first rotor having at least one row of outwardly extending fan blades and including an island splitter disposed immediately downstream of said fan blades; and a core section including at least one row of outwardly extending, first compressor blades which are positioned downstream of the island splitter and which are mechanically coupled to said first rotor, and including a second rotor having at least one row of outwardly extending second compressor blades which are positioned downstream of said first compressor blades wherein said core section further includes a core case spaced radially apart from said island splitter and circumscribing the rows of compressor blades to aerodynamically couple the first and second compressor blades.

* * * * *